Oct. 9, 1951    H. L. QUIST    2,570,376
ELECTRICAL HEATING MEANS FOR SILOS
Filed March 2, 1950
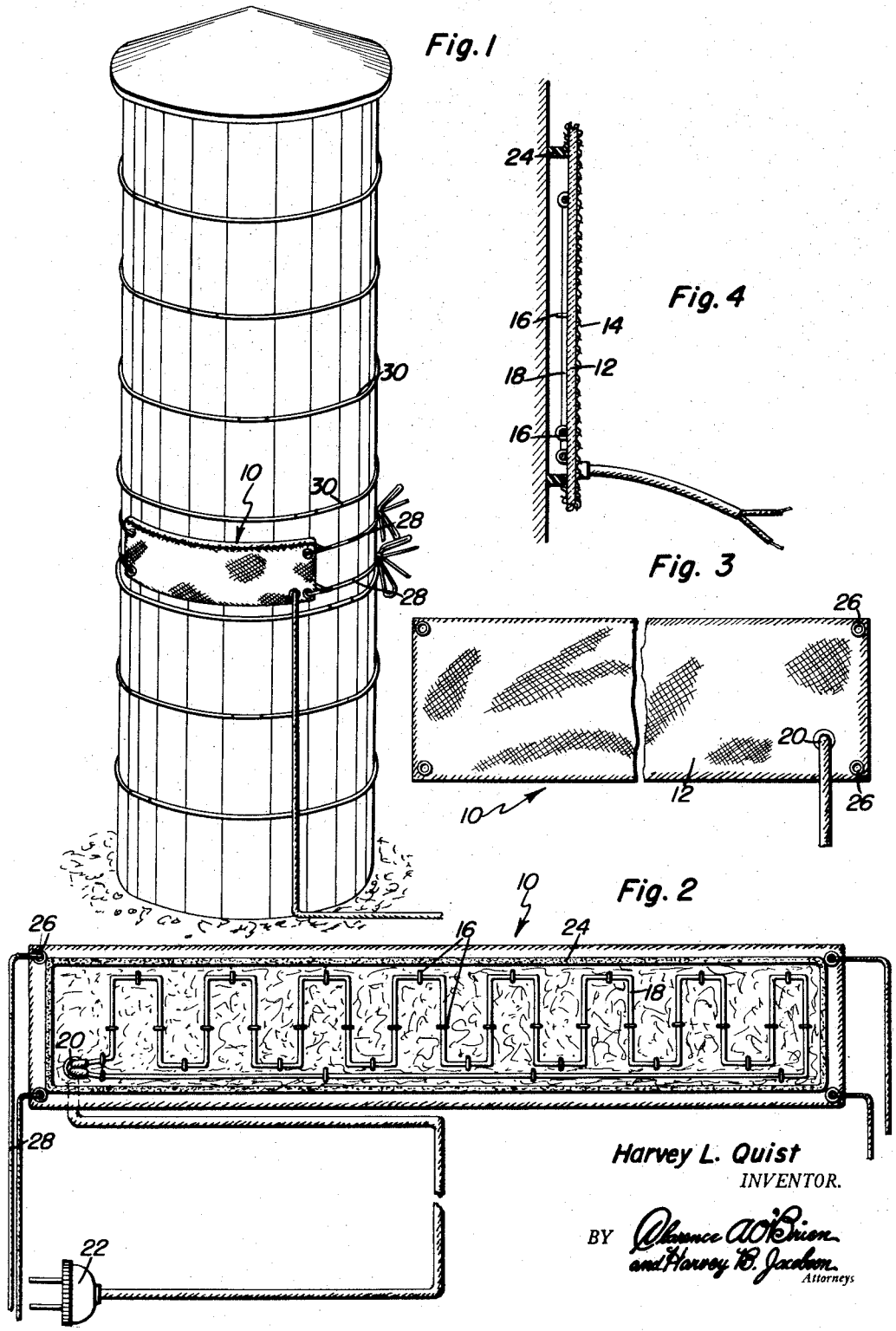
Harvey L. Quist
INVENTOR.

Patented Oct. 9, 1951

2,570,376

UNITED STATES PATENT OFFICE 2,570,376

ELECTRICAL HEATING MEANS FOR SILOS

Harvey L. Quist, St. Croix Falls, Wis.

Application March 2, 1950, Serial No. 147,222

2 Claims. (Cl. 214—46)

This invention relates to heating means for silage in silos, and more particularly to an electrical heating element adapted to be secured on a silo to heat the silage therein to prevent its freezing to the walls of the silo.

An object of the invention resides in the provision of a water-proof and thermally insulative electrical heating element adapted to be secured on the outer wall of a silo in order that the silage in the silo will not be frozen against the inner walls of the silo when the temperature falls substantially below the freezing point.

A further object of the invention is to provide electrical heating means for silos which will prevent the silage adjacent the inner walls of a silo from freezing thereto, thus becoming highly dangerous to farmers. As is well known, frozen silage is usually left on the walls of a silo forming a crust which may be a foot or more in thickness. In springtime when this frozen silage becomes thawed, it is apt to fall on a farmer in the silo, thus causing injury or even death to the farmer. It is therefore yet another object of the invention to provide means for preventing silage from adhering to the inner walls of a silo during cold weather.

A most important object of this invention is to provide an electrical heating means for a silo which will have a heat insulative outer sheet having on its inner surface electrical resistance cables secured thereto. The outer sheet is secured to the silo by means of ties and the heat from the resistance cables is retained by flexible and preferably thermally insulative edging members spaced from the peripheral edge of the outer sheet.

Still further objects of the invention reside in the provision of heating means for silos which are substantially weather-proof, strong, durable, highly efficient in operation, simple in construction and manufacture, capable of being readily secured about a silo, and which is quite inexpensive.

These, together with the various ancillary objects of the invention which will become apparent as the following description proceeds, are attained by this electrical heating element, a preferred embodiment of which has been illustrated in the accompanying drawings, by way of example only, wherein:

Figure 1 is a perspective view showing the electrical heating means comprising the present invention in operative emplacement on a silo;

Figure 2 is a side elevational view of the invention;

Figure 3 is another side elevational view of the invention as shown in Figure 2 looking at the outer surface of the outer sheet; and Figure 4 is a vertical sectional view in an enlarged scale showing the electrical heating element in operative emplacement on the silo.

With continuing reference to the accompanying drawings, wherein like reference numerals designate similar parts throughout the various views, the reference numeral 10 generally designates the electrical heating means comprising the present invention. This electrical heating element comprises an outer sheet 12 which is made from suitable insulative material having an outer facing 14 of water-proof canvas or the like. The outer facing of the sheet may be suitably coated and treated as desired with any of the well-known water-proof coatings.

Stapled, clipped, or otherwise secured as is shown at 16 is an electrical resistance cable 18 which is preferably formed with an insulative covering to prevent the possibility of any short circuits. The ends of the cable are joined together and passed through an aperture 20 in the sheet and are then secured and operatively electrically connected to a male plug 22 of conventional design which may be readily inserted into a suitable outlet connected to a commercial power source or any other suitable electrical power supply.

Secured to the inner face of the sheet 12 as is the resistance cable 16 is an edging member 24 formed from a flexible material having good thermal insulative qualities. The edging member 24 extends about the sheet 12 and is spaced from the peripheral edge of the sheet 12. Secured through grommets 26 formed in the corners of the outer sheet 12 are tie wires or ropes 28. These tie rods or ropes are adapted to be secured together so as to hold the heating element operatively when properly emplaced on the silo with the edging member 24 abutting against the silo. As can be readily seen, the edging member together with the outer insulative sheet 12 provides a heat barrier, causing the heat generated by the resistance coil 16 to be directed against the silo wall. The edging member 24 is formed from a resilient material in order that it may more intimately mesh with the configurated outer surface of the silo. Further, the edging member is spaced from the peripheral edge of the outer sheet in order that when the ties 28 are secured, greater bearing pressure may be imparted to the edging member. If desired, the ties may be secured, when emplaced on some classes of silos, to the circular tension or reinforcement bands 30 or the like which hold the stays of the silo in a secure manner.

Since, from the foregoing, the construction and advantages of this electrical heating element for silage is readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A heating pad comprising a first elongated sheet of flexible heat insulating material, a second elongated sheet of flexible waterproof material overlying one face of said first sheet, the marginal edge portions of said second sheet being folded over upon said first sheet, a flexible edging secured to the folded marginal edge portion of said second sheet inwardly of the edge of said first sheet, said edging forming a frame adapted to sealingly engage a supporting surface and space said first sheet from the supporting surface, a heating element disposed within the frame formed by said flexible edging, fasteners securing said heating element to said first sheet, and ties secured to the ends of said heating pad outwardly of said flexible edging for attaching said heating pad to a supporting surface.

2. The combination of claim 1, wherein said heating element includes a plurality of connected segments extending transversely of said first sheet.

HARVEY L. QUIST.

REFERENCES CITED

The following references are of record in the file of this patent:

UNITED STATES PATENTS

| Number | Name | Date |
|---|---|---|
| 1,244,817 | Willson | Oct. 30, 1917 |
| 1,321,462 | Line | Nov. 11, 1919 |
| 1,406,360 | Forshee | Feb. 14, 1922 |
| 2,032,294 | McDonald | Feb. 25, 1936 |

FOREIGN PATENTS

| Number | Country | Date |
|---|---|---|
| 540,955 | Great Britain | Nov. 6, 1942 |